Aug. 23, 1966     M. L. OLDS     3,268,709
ELECTRIC WELDER CONTROLS
Filed Oct. 16, 1964
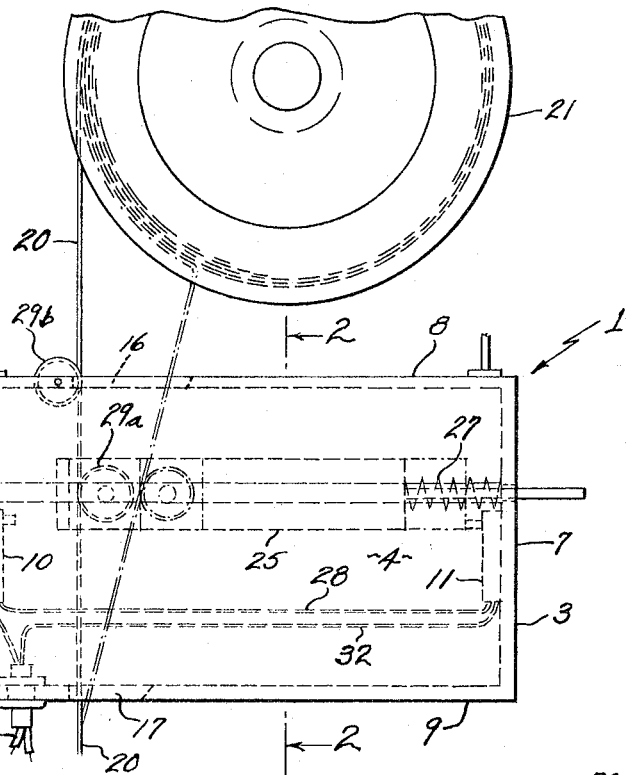
Fig. 1
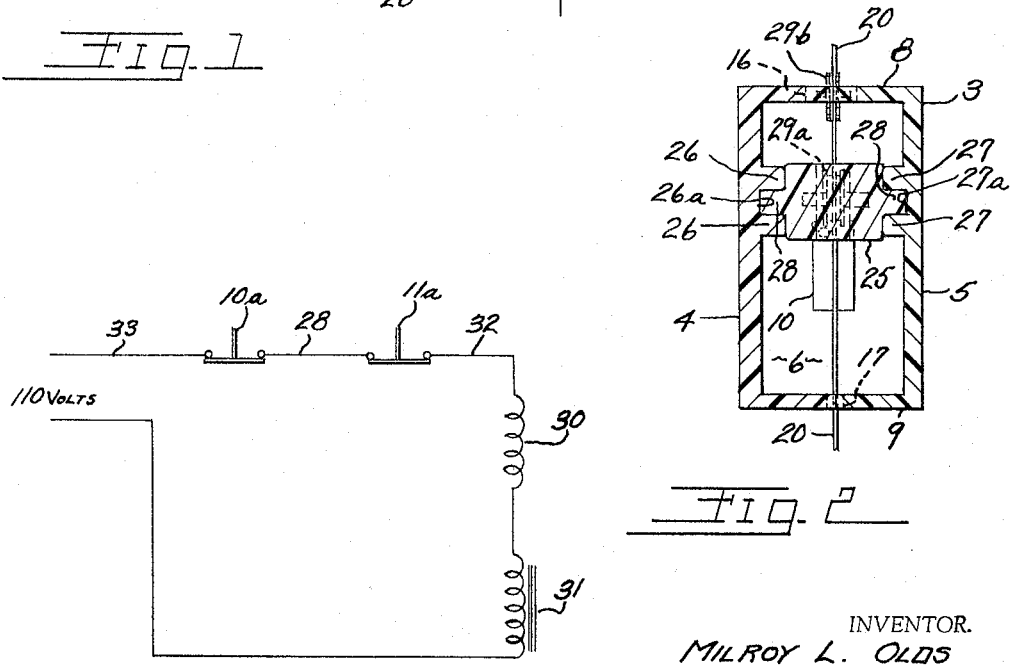
Fig. 2
Fig. 3
INVENTOR.
MILROY L. OLDS
BY
Meyer, Baldwin, Doran & Egan
ATTORNEYS

United States Patent Office 3,268,709
Patented August 23, 1966

3,268,709
ELECTRIC WELDER CONTROLS
Milroy L. Olds, South Euclid, Ohio, assignor to Industrial Welding Equipment Co., Cleveland, Ohio, a corporation of Ohio
Filed Oct. 16, 1964, Ser. No. 404,291
5 Claims. (Cl. 219—130)

The present invention relates to electric welder circuit controls that are especially adapted for use in automatic welding units in which welding wire is delivered from a coil to a point of welding by means of a motor drive.

In automatic welding operations, in which a welding wire is supplied from a coil to a point where the welding is to take place, the welding electrode contactor can be damaged when the coil of wire is exhausted—unless the power is turned off promptly. Also, unless the power is quickly cut off, the welding electrode contactor can be damaged if the wire becomes tangled or snarled in delivery from its coil to a point of welding.

Therefore, it is an object of the present invention to provide an electric circuit control device for automatic welding equipment that is effective to disconnect the equipment from its power source.

It is also an object of the present invention to provide a control device for use in an electric control circuit for a welding unit in which welding wire is continually fed to electrodes, the control device preventing damage to the welding electrode contactor when the supply of wire is exhausted.

It is also an object of the present invention to provide a control device comprising switch means for use in an automatic welding unit in which welding wire is continually fed, the switch means effective to turn off the welding unit so as to prevent damage to the welding electrode contactor when the wire becomes tangled.

It is an object of the present invention to provide an electric welder control for use in automatic welding equipment in which welding wire is continually fed to a point of welding, the control including switch means responsive to interruption of welding wire being delivered to the point of welding so as to disconnect said equipment from its power source.

Additional objects will become apparent from the specification that follows, the appended claims and the drawings in which:

FIGURE 1 is a fragmentary side elevational view of the electric welding control device of the present invention, the device being used in an automatic welding operation in which welding wire is continuously fed to electrodes from a supply coil;

FIGURE 2 is a sectional view taken along the line indicated at 2—2 in FIGURE 1; and FIGURE 3 is a schematic wiring diagram of one embodiment of an electrical control circuit for use with the control device of FIGURE 1.

The present invention provides an electric welding control device 1 comprising a box-like housing 3 having side walls 4 and 5, end walls 6 and 7, a top wall 8, and a bottom wall 9. A normally-closed switch 10 is mounted on the inside of wall 6 and a normally closed switch 11 is mounted on the inside of wall 7. The top wall 8 of the box has an opening 16 and the bottom wall has an opening 17.

A welding wire 20 is continuously supplied to electrodes (not shown) by a drive means such as a drive motor. The wire 20 is supplied from a coil 21, the wire 20 passing through the housing 3 by means of entrance opening 16 and exit opening 17 for continuous feeding of said wire to welding electrodes.

A plunger 25 is movably supported in said housing between switches 10 and 11, a spring 27 biasing the plunger in a direction to the left in FIGURE 1 toward the switch 10. The length of welding wire 20 being threaded through the housing engages the plunger and pushes against the spring 27 to position the plunger in spaced relation to each of the switches.

In accordance with the present invention, when the wire 20 is exhausted from the coil 21 and the length of wire passes by plunger 25 to clear the housing through discharge opening 17, the plunger 25 is moved by spring 27 into engagement with switch 10 which is effective to disconnect the welding unit from its power source.

Also in accordance with the present invention, when the wire 20 becomes tangled or snarled as it is delivered from the coil, the wire 20 will force the plunger to the right in FIGURE 1 as shown in dot-dash lines to contact switch 11, the force of the tangled wire overcoming the force of the spring in the opposite direction. The contacting of switch 11 causes the switch to operate to its open position which disconnects the welding unit from its power source.

As best seen in FIGURE 2, ribs 26 are formed on the inside of wall 4, the ribs defining a groove 26a. Likewise ribs 27 are provided in side wall 5, the ribs running substantially the length of the wall 5 and defining a longitudinally extending groove 27a, the groove 27a being generally horizontally aligned with groove 26a. The plunger 25 has groove-engaging projections 28 on each side thereof, said projections being effective to engage the grooves 26a and 27a and permit the plunger to slide toward or away from end wall 6 or end wall 7.

As best seen in FIGURES 1 and 2, a guide pulley wheel 29a is provided near the end of the plunger and rotatably supported therewithin to facilitate the feeding of the wire past the plunger. An upper guide pulley wheel 29b is supported on wall 8 at the top of the housing so that the wire can be easily fed through the top opening 16 to the bottom opening 17.

The configuration of the electrical control circuit shown in FIGURE 3 includes the aforementioned switches 10 and 11, each of which has a normally closed contact 10a and 11a, respectively. The contacts 10a and 11a are connected by wire 28 in series circuit relation with each other. A coil 30 of a drive motor and a welding coil 31 are provided and as shown in FIGURE 3, these coils are connected in series circuit relation with said switch contacts 10a and 11a. Thus, the switches 10 and 11 control the application of a suitable voltage such as 110 volts across the coils 30 and 31 whereby the opening of either switch disconnects the power to the welding unit. One side of switch contact 11a is connected to the motor coil 30 by wire 32. The other side of switch contact 10a is connected to the 110 volt power supply by wire 33 to complete the control circuit as illustrated in FIGURE 3.

It is understood that, in accordance with the provisions of the patent statutes, variations and modifications of the specific invention may be made without changing the spirit thereof.

What is claimed is:
1. A control device for use in an electrical control circuit for a welding unit having a source of electrical welding energy and drive means for driving a length of welding wire into welding position, the device comprising a housing, a source of primary electrical power, a pair of normally closed switches in said housing connected in series circuit relation with each other, said source and said drive means being connected across a primary electrical source of power, switch-actuating means movably supported in said housing between said switches, said length of welding wire being threaded through said housing and engaging said switch-actuating means and being effective to position said means in spaced relation to each of said switches, said means being reciprocably mounted for to and fro movement into predetermined engagement with one of the switches upon the passing of the end of the length of the wire through the housing, the movement of the switch actuating means being effective to open said switch and disconnect the welding unit from said power source.

2. A control device for use in an electrical control circuit for a welding unit having a source of electrical welding energy and drive means for driving a length of welding wire into welding position, the device comprising a housing, a pair of normally closed switches in said housing connected in series circuit relation with each other, said drive means being connected across a primary electrical source of power, a spring biased plunger movably supported in said housing between said switches, said length of welding wire being threaded through said housing and engaging said plunger, the wire being effective to position said plunger in spaced relation to each of said switches, said plunger being movable into engagement with one of said switches after the length of wire is exhausted and has passed through said housing, the movement of the plunger being effective to open said switch and disconnect the welding unit from said power source.

3. A control device for use in an electrical control circuit for a welding unit having a source of electrical welding energy, and a drive motor for driving a length of welding wire into welding position, the device comprising a box-like housing, a pair of normally closed switches in said housing connected in series circuit relationship with each other, said pair of switches and said source and said drive motor being connected across a primary electrical source of power, a spring biased plunger movably supported in said housing between said switches, said plunger having ribs that slidably engage grooves provided in the sides of said housing, said length of welding wire being threaded through said housing and engaging said plunger and being effective to position said plunger in spaced relation to each of said switches, said plunger being movable upon the length of wire having passed through said housing into engagement with one of said switches effective to open said switch and disconnect the welding unit from said power source.

4. A control device for use in an electrical control circuit for a welding unit having a source of electrical welding energy and drive means for driving a length of welding wire into welding position, the device comprising a housing, a pair of normally closed switches in said housing connected in series circuit relation with each other, said source of energy and said drive means being connected across a primary electrical source of power, a spring biased plunger movably supported in said housing between said switches, said length of welding wire being threaded through said housing and engaging said plunger and being effective to position said plunger in spaced relation to each of said switches, said plunger being movable into engagement with one of said switches by said length of wire when said wire becomes tangled to thereby disconnect the welding unit from said power source.

5. A control device for use in an electric control circuit for a welding unit having a source of electrical welding energy and drive means for driving a length of welding wire into welding position, the device comprising a housing, switch means in said housing connected in series circuit relation with said drive means across a primary electrical source of power, switch actuating means movably supported in said housing, said length of welding wire being threaded through said housing and engaging said switch actuating means, the wire being effective to position said actuating means in spaced relation to the switch means, said actuating means being reciprocably mounted for to and fro movement and biased in such to and fro movement by interruption of welding wire being delivered to the point of welding whereby said actuating means opens the switch means and disconnects the welding unit from said power source.

References Cited by the Examiner
FOREIGN PATENTS 349,804    3/1922    Germany.
104,944    7/1942    Sweden.
162,293    2/1958    Sweden.

RICHARD M. WOOD, *Primary Examiner.*

ANTHONY BARTIS, *Examiner.*